US005837340A

United States Patent [19]

Law et al.

[11] Patent Number: 5,837,340

[45] Date of Patent: Nov. 17, 1998

[54] INSTANT ON FUSER SYSTEM MEMBERS

[75] Inventors: Kock-Yee Law, Penfield; Ihor W. Tarnawskyj, Webster; Joseph Mammino, Penfield; Kathleen M. McGrane; Martin A. Abkowitz, both of Webster; Robert M. Ferguson, Penfield; Frederick E. Knier, Jr., Wolcott, all of N.Y.

[73] Assignee: Xerox Corporation, Stamford, Conn.

[21] Appl. No.: 706,387

[22] Filed: Aug. 30, 1996

[51] Int. Cl.[6] .......... B29D 23/00; G03G 15/20

[52] U.S. Cl. .......... 428/36.8; 428/35.9; 428/36.91; 428/333; 428/421; 428/422; 219/216; 219/469; 430/124; 430/126; 432/60; 432/228; 492/53; 492/54; 524/495

[58] Field of Search .......... 428/35.9, 36.8, 428/36.91, 421, 473.5, 333, 422, 451; 219/216, 469; 432/60, 228; 524/495, 545, 546; 492/53, 54; 430/124, 126

[56] References Cited

U.S. PATENT DOCUMENTS

| | | | |
|---|---|---|---|
| 4,514,486 | 4/1985 | Shirose et al. | 430/124 |
| 4,524,119 | 6/1985 | Luly et al. | 430/108 |
| 4,653,899 | 3/1987 | Fromm | 355/3 FU |
| 5,084,738 | 1/1992 | Ishikawa | 355/285 |
| 5,087,946 | 2/1992 | Dalal et al. | 355/285 |
| 5,157,446 | 10/1992 | Kusaka | 355/285 |
| 5,410,394 | 4/1995 | Wayman et al. | 355/285 |
| 5,418,105 | 5/1995 | Wayman et al. | 430/126 |
| 5,436,712 | 7/1995 | Wayman et al. | 355/290 |
| 5,450,182 | 9/1995 | Wayman et al. | 355/285 |
| 5,471,291 | 11/1995 | Janes et al. | 355/326 R |

FOREIGN PATENT DOCUMENTS

SHO 63-44224 8/1988 Japan .

OTHER PUBLICATIONS

JP 08015960 A Publication —Japan—translation enclosed.

JP 7160135 A Abstract —Japan.

*Primary Examiner*—Fred Teskin

*Attorney, Agent, or Firm*—Annette Bade

[57] ABSTRACT

A fuser system member for use in an electrophotographic apparatus for fusing toner images to a copy substrate, the fuser member having a substrate, a heat generating layer provided thereon comprising a fluorinated carbon filled fluoroelastomer, and an outer toner release layer provided on the heat generating layer.

33 Claims, 1 Drawing Sheet

INSTANT ON FUSER SYSTEM MEMBERS

CROSS REFERENCE TO RELATED APPLICATIONS

Attention is directed to the following copending applications assigned to the assignee of the present application: Attorney Reference D/95634Q U.S. application Ser. No. 672,803 pending filed Jun. 28, 1996, entitled, Bias Charging Member with Fluorinated Carbon Filled Fluoroelastomer Outer Layer Attorney Reference D/95634 U.S. application Ser. No. 635,356 pending filed Apr. 19, 1996, entitled, Bias Transfer Members with Fluorinated Carbon Filled Fluoroelastomer Outer Layer U.S. Pat. No. 5,761,595 Attorney Reference D/95632 U.S. application Ser. No. 779,287 filed Jan 21, 1997, entitled, Intermediate Transfer Members;" and Attorney Reference D/96044Q U.S. application Ser. No. 706,057 filed Aug. 30, 1996 U.S. Pat. No. 5,765,085, entitled, Apparatus and Fixing Film, The disclosures of each of these applications are hereby incorporated by reference in their entirety.

BACKGROUND OF THE INVENTION

The present invention relates to fuser systems, and more specifically, to fluorinated carbon filled elastomers useful as layers for electrostatographic members, especially xerographic members such as fuser system members, and methods thereof. In embodiments, there are selected fluorinated carbon filled elastomers which are useful as layers for components in electrostatographic processes, especially xerographic processes, including surfaces of donor belts, films, rolls, and the like; pressure belts, films, rolls, and the like, especially instant on pressure rolls; and fuser belts, films, rolls, and the like, especially instant on fuser rolls; and other similar members. In embodiments, the present invention allows for the preparation and manufacture of fuser system members with superior electrical and mechanical properties. Moreover, in embodiments, the warming up period for the fuser member is decreased, and the power consumption of the fuser member is decreased, while allowing for high operating temperature and mechanical strength. Also, in embodiments, the layers permit a decrease in contamination of other xerographic components such as photoconductors. Further, in embodiments, the layers also exhibit excellent properties such as statistical insensitivity of conductivity to increases in temperature and to environmental changes. In addition, in embodiments, the layers have a low surface energy and the conformity of the layers is not adversely affected.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 200° C. or higher depending upon the softening range of the particular resin used in the toner. It is undesirable, however, to increase the temperature of the substrate substantially higher than about 250° C. because of the tendency of the substrate to discolor or convert into fire at such elevated temperatures, particularly when the substrate is paper.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members. The fusing of the toner particles takes place when the proper combination of heat, pressure and contact time are provided. The balancing of these parameters to bring about the fusing of the toner particles is well known in the art, and can be adjusted to suit particular machines or process conditions.

However, such heat fixing apparatii demonstrate problems due to the lengthy warm-up time required before the heating body is raised to a specified temperature. In some machines, the fuser member is in heated mode 90 to 100% of the time the machine is turned on. Because the fuser is heated at all times, there is an increased chance of overheating, and mechanical problems resulting from the fuser member overheating or breaking down from overuse.

Moreover, with the fuser member continuously being heated, much energy is wasted. The Environmental Protection Agency has proposed new "energy star" guidelines for printers and copiers. Current fusers that operate in a continuous heat mode may not meet the expectations of a "green machine."

A preferred fusing system for copying and printing is the use of an "instant on" fuser system, wherein the image on a copy substrate is fused by positioning the paper through a nip between a fuser roll and a pressure roll, the fuser roll and/or pressure role comprising a high temperature plastic core substrate, a heat generating layer and a toner releasing layer (or heat transporting layer). The fuser converts electric energy directly to thermal energy, and is therefore more energy efficient. The instant on fuser member is advantageous in that the warming up period is reduced as the heater is quick to respond. In addition, the instant on fuser member allows for a reduction in energy consumption because the heater is off when the machine is not copying.

Instant on fusing systems as set forth above are well known and disclosed in, for example, U.S. Pat. No. 5,087,946 to Dalal et al., the disclosure of which is hereby incorporated by reference in its entirety. This reference discloses an instant on fusing system including a fuser roll having a hollow plastic cylinder having a conductive fiber filler and having a relatively thin wall, a back up roll disposed in an engaging relationship, and a heating element disposed within the fuser roll.

During operation of a fusing system in which heat is applied to cause thermal fusing of the toner particles onto a support, both the toner image and the support are passed through a nip formed between the roll pair, or plate or belt members, or film and heater. The concurrent transfer of heat and the application of pressure in the nip affects the fusing of the toner image onto the support. It is important in the fusing process that no offset of the toner particles from the support to the fuser member take place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

U.S. Pat. No. 5,084,738 discloses use of a resistive heating layer with resistivity ranging from 20 to 2000 ohm-cm in a fusing apparatus. The resistivity of the layer is achieved by adding conductive carbon fillers into a polymer layer. There exists a specific need for a fusing system member which is quick to heat up, and which allows for decreased use of energy. In addition, there exists a need for a fuser member surface which has a stable conductivity in the desired resistivity range and in which the conformability and low surface energy properties of the release layer are not affected. There further exists a need for a fusing system which provides for good release properties and a decrease in the occurrence of hot offset.

SUMMARY OF THE INVENTION

Examples of objects of the present invention include:

It is an object of the present invention to provide fusing system members and methods thereof with many of the advantages indicated herein.

It is another object of the present invention to provide a fuser system member which allows for a decrease in warm up time.

It is further an object of the present invention to provide a fuser system member having high mechanical strength.

It is yet another object of the present invention to provide a fuser system member having a low surface energy.

Another object of the present invention is to provide a fuser system member which maintains excellent release properties thereby decreasing the occurrence of hot offset.

Still yet another object of the present invention is to provide a fuser system member which allows for a reduction in energy upon use.

Still a further object of the present invention is to provide a fuser system member which is light weight.

It is a further object of the present invention to provide a fuser system member which possesses a conductivity that is virtually insensitive to environmental changes and to increases in temperature.

Another object of the present invention is to provide a fuser system member which permits a decrease in contamination of other xerographic components such as photoreceptors.

A further object of the present invention is to provide a fuser system member which is low in cost.

Yet another object of the present invention is to provide a fuser system member which has high heat insulation, which improves the thermal efficiency of the fusing system.

Still yet another object of the present invention is to provide a fuser system member which has high electric insulation.

Yet a further object of the present invention is to provide a fuser system member which is light weight.

These and other objects have been met by the present invention which includes, in embodiments: a fuser member comprising: a fuser member comprising: a) a plastic substrate; b) a heat generating layer provided on said substrate, said heat generating layer comprising a fluorinated carbon filled fluoroelastomer; and c) a toner release layer provided on said heat generating layer.

These and other objects have further been met by the present invention which also includes, in embodiments: a fuser member having the ability to warm up to a temperature of up to about 200° C. in a time of less than about 1 minute comprising: a) a plastic cylindrical roll substrate; b) a heat generating layer provided on said roll substrate, said heat generating layer comprising a fluorinated carbon and silver filled fluoroelastomer; and c) a toner release layer provided on said heat generating layer.

In addition, these and other objects have been met by the present invention which further includes, in embodiments: a fuser member having the ability to warm up to a temperature of up to about 200° C. in a time of less than bout 30 seconds comprising: a) a plastic cylindrical roll substrate; b) a heat generating layer provided on said roll substrate, said heat generating layer comprising a fluorinated carbon and silver filled fluoroelastomer, wherein said heat generating layer has a resistance of from about 5 to 100 ohms; and c) a toner release layer provided on said heat generating layer.

The fuser members provided herein, the embodiments of which are further described herein, enable control of the desired resistance, allow for uniform electrical properties, allow for more stable mechanical properties, have improved insensitivities to environmental and mechanical changes, have quick warm up time, decrease the energy consumption, and decrease contamination of other xerographic components such as photoconductors.

BRIEF DESCRIPTION OF THE DRAWINGS

For a better understanding of the present invention, reference may be had to the accompanying drawing.

DETAILED DESCRIPTION OF THE PRESENT INVENTION

Figure 1:
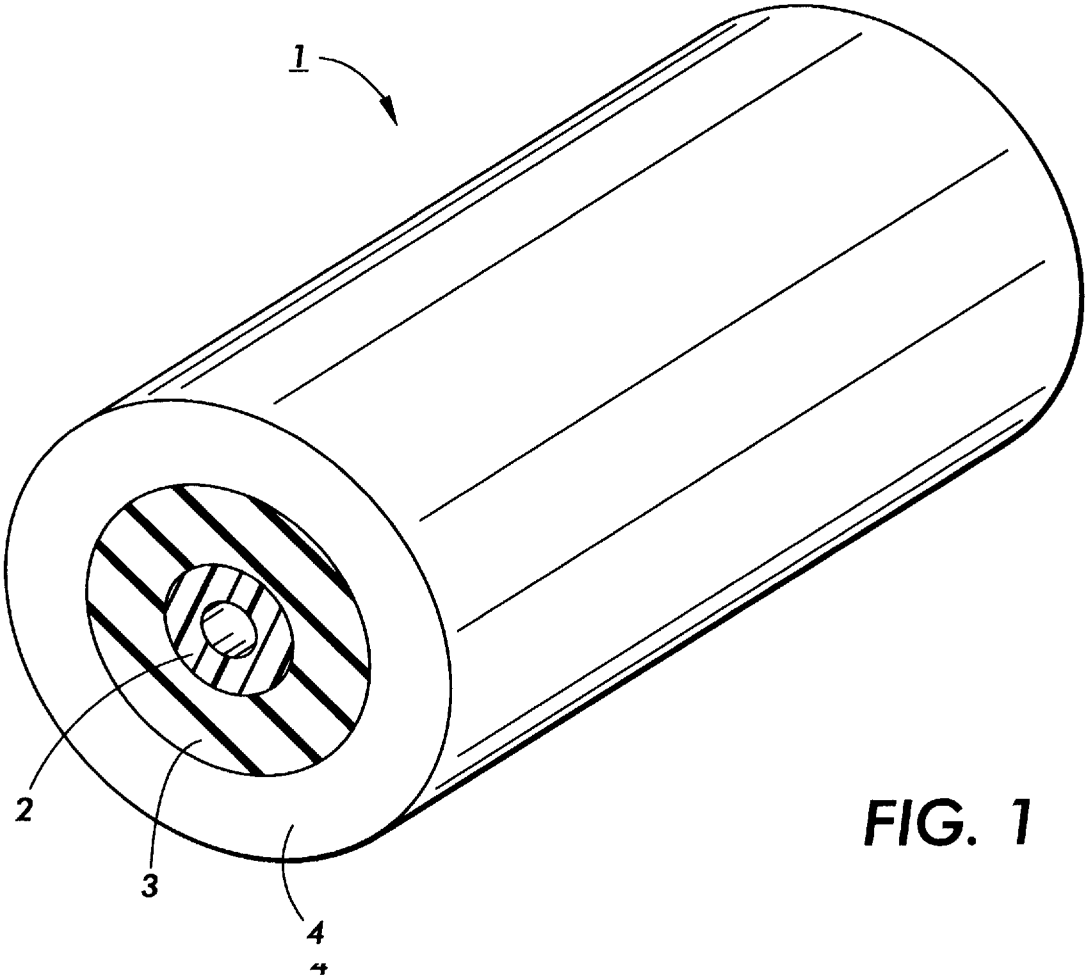
FIG. 1 is an illustration of a preferred embodiment of a fuser member described herein.

The present invention relates to fuser systems comprising fuser members, which herein relates to, in embodiments, a fuser roll, donor roll or pressure roll, having an inner high temperature plastic substrate, and having thereon, a heat generating layer, and having on the outer surface thereof a toner releasing layer. A pressing roll or belt is used in connection with the fusing roll and the copy substrate having toner thereon is brought into contact with the nip formed between the pressure roll or belt and the fuser roller. Generally, the construction of the instant on fuser is well known as set forth in Dalal et al. (U.S. Pat. No. 5,087,946) discussed in the background above.

Referring to FIG. 1, there is shown by way of example, a preferred fuser member 1 of the present invention. The fuser member comprises a hollow cylindrical plastic core 2 comprised of a high temperature plastic and thereover a heat generating layer 3 comprised of a fluorinated carbon filled fluoroelastomer optionally filled with a conductive filler, and thereover as the outer layer of the fuser member, a toner releasing layer (or heat transporting layer) 4 which may be comprised of a fluoroelastomer or silicone material or other polymer material and optionally filled with a thermally conductive filler. Optional additional intermediate layers and/or adhesive layers may be present between the inner plastic core 2 and the heat generating layer 3 and/or between the heat generating layer 3 and the outer toner releasing layer 4.

The fuser system members herein contain heat generating layers comprising fluorinated carbon filled fluoroelastomers. In a preferred embodiment, silver powders are added into the heating generating layer to render the layer conductive enough as a resistive heater. The use of fluorinated carbon stabilizes the coating dispersion and also enhances the uniformity of the filled layer. The fluorinated carbon is believed to crosslink with the fluoroelastomer upon curing of the coated heat generating layer.

Fluorinated carbon, sometimes referred to as graphite fluoride or carbon fluoride is a solid material resulting from the fluorination of carbon with elemental fluorine. The number of fluorine atoms per carbon atom may vary depending on the fluorination conditions. The variable fluorine atom to carbon atom stoichiometry of fluorinated carbon permits systemic, uniform variation of its electrical resistivity properties. Controlled and specific resistivity is a highly desired feature for an outer surface of a fuser system member.

Fluorinated carbon, as used herein, is a specific class of compositions which is prepared by the chemical addition of fluorine to one or more of the many forms of solid carbon. In addition, the amount of fluorine can be varied in order to produce a specific, desired resistivity. Fluorocarbons are either aliphatic or aromatic organic compounds wherein one or more fluorine atoms have been attached to one or more carbon atoms to form well defined compounds with a single sharp melting point or boiling point. Fluoropolymers are linked-up single identical molecules which comprise long chains bound together by covalent bonds. Moreover, fluoroelastomers are a specific type of fluoropolymer. Thus, despite some apparent confusion in the art, it is apparent that fluorinated carbon is neither a fluorocarbon nor a fluoropolymer and the term is used in this context herein.

The fluorinated carbon material may include the fluorinated carbon materials as described herein. The methods for preparation of fluorinated carbon are well known and documented in the literature, such as in the following U.S. Pat. No. 2,786,874; 3,925,492; 3,925,263; 3,872,032 and 4,247,608, the disclosures of which are totally incorporated by reference herein. Essentially, fluorinated carbon is produced by heating a carbon source such as amorphous carbon, coke, charcoal, carbon black or graphite with elemental fluorine at elevated temperatures, such as 150°–600° C. A diluent such as nitrogen is preferably admixed with the fluorine. The nature and properties of the fluorinated carbon vary with the particular carbon source, the conditions of reaction and with the degree of fluorination obtained in the final product. The degree of fluorination in the final product may be varied by changing the process reaction conditions, principally temperature and time. Generally, the higher the temperature and the longer the time, the higher the fluorine content.

Fluorinated carbon of varying carbon sources and varying fluorine contents is commercially available from several sources. Preferred carbon sources are carbon black, crystalline graphite and petroleum coke. One form of fluorinated carbon which is suitable for use in accordance with the invention is polycarbon monofluoride which is usually written in the shorthand manner $CF_x$ with x representing the number of fluorine atoms and generally being up to about 1.5, preferably from about 0.01 to about 1.5, and particularly preferred from about 0.04 to about 1.4. The formula $CF_x$ has a lamellar structure composed of layers of fused six carbon rings with fluorine atoms attached to the carbons and lying above and below the plane of the carbon atoms. Preparation of $CF_x$ type fluorinated carbon is described, for example, in above-mentioned U.S. Pat. Nos. 2,786,874 and 3,925,492, the disclosures of which are incorporated by reference herein in their entirety. Generally, formation of this type of fluorinated carbon involves reacting elemental carbon with $F_2$ catalytically. This type of fluorinated carbon can be obtained commercially from many vendors, including Allied Signal, Morristown, N.J.; Central Glass International, Inc., White Plains, N.Y.; Diakin Industries, Inc., New York, N.Y.; and Advance Research Chemicals, Inc., Catoosa, Okla.

Another form of fluorinated carbon which is suitable for use in accordance with the invention is that which has been postulated by Nobuatsu Watanabe as poly(dicarbon monofluoride) which is usually written in the shorthand manner $(C_2F)_n$. Preparation of $(C_2F)_n$ type fluorinated carbon is described, for example, in above-mentioned U.S. Pat. No. 4,247,608, the disclosure of which is herein incorporated by reference in its entirety, and also in Watanabe et al., "Preparation of Poly(dicarbon monofluoride) from Petroleum Coke", Bull. Chem. Soc. Japan, 55, 3197–3199 (1982), the disclosure of which is also incorporated herein by reference in its entirety.

In addition, preferred fluorinated carbons selected include those described in U.S. Pat. No. 4,524,119 to Luly et al., the subject matter of which is hereby incorporated by reference in its entirety, and those having the tradename Accufluor®, (Accufluor® is a registered trademark of Allied Signal, Morristown, N.J.) for example, Accufluor® 2028, Accufluor® 2065, Accufluor® 1000, and Accufluor® 2010. Accufluor® 2028 and Accufluor® 2010 have 28 and 11 percent fluorine content, respectively. Accufluor® 1000 and Accufluort® 2065 have 62 and 65 percent fluorine content respectively. Also, Accufluor® 1000 comprises carbon coke, whereas Accufluor® 2065, 2028 and 2010 all comprise conductive carbon black. These fluorinated carbons have the formula $CF_x$ and are formed by the reaction of $C+F_2=CF_x$.

The following chart demonstrates some properties of four preferred fluorinated carbons useful in the present invention.

| PROPERTIES | ACCUFLUOR | | | | UNITS |
|---|---|---|---|---|---|
| GRADE | 1000 | 2065 | 2028 | 2010 | N/A |
| Feedstock | Coke | Conductive Carbon Black | | | N/A |
| Fluorine Content | 62 | 65 | 28 | 11 | % |
| True Density | 2.7 | 2.5 | 2.1 | 1.9 | g/cc |
| Bulk Density | 0.6 | 0.1 | 0.1 | 0.09 | g/cc |
| Decomposition Temperature | 630 | 500 | 450 | 380 | °C. |
| Median Particle Size | 8 | <1 | <1 | <1 | micrometers |
| Surface Area | 130 | 340 | 130 | 170 | $m^2/g$ |
| Thermal Conductivity | $10^{-3}$ | $10^{-3}$ | $10^{-3}$ | N.A | cal/cm-sec-°C. |
| Electrical Resistivity | $10^{11}$ | $10^{11}$ | $10^{8}$ | <10 | ohm-cm |
| Color | Gray | White | Black | Black | N/A |

The amount of fluorinated carbon in the heat generating layer is from about 1 to about 50 percent by weight of the total solids content, and preferably from about 5 to about 30 weight percent based on the weight of total solids. This amount is the amount which provides a roll resistance of the heat generating layer of from about 2 ohms to about 500 ohms, preferably from about 5 ohms to about 100 ohms, and particularly preferred about 15 ohms to about 25 ohms.

In addition, and in preferred embodiments, other conductive additives can be used in addition to fluorinated carbon in order achieve certain resistance in the heat generating layer. In addition, these additives may also be present in the toner releasing layer, although it may not be suitable to use fluorinated carbon in the toner releasing layer. Examples of suitable conductive additives include carbon black, graphite and the like; metal fibers and metal powder particles such as silver, nickel, aluminum, and the like; metal oxides such as aluminum oxide, magnesium oxide, tin oxide, titanium oxide, iron oxide, and the like; along with other known conductive ceramic powders. It is preferred to add a metal such as silver along with fluorinated carbon in the heat generating layer. The specific desired resistance can be designed by use of the specific amount of silver and fluorinated carbon in the heat generating layer. These additives may be present in the heat generating layer in an amount of from about 10 to about 80 percent by weight based on the weight of total solids, preferably from about 20 to about 70 weight percent. Alternatively, in the toner releasing layer, thermally conductive additives may be present in an amount of from about 3 to about 40 percent by weight of total solids, and preferably from about 5 to about 30 percent by weight.

Examples of the heat generating layers or toner release layers of the instant on fuser system members include elastomers such as fluoroelastomers. Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures of which are incorporated by reference herein in their entirety. As described therein these fluoroelastomers, particularly from the class of copolymers and terpolymers of vinylidenefluoride hexafluoropropylene and tetrafluoroethylene, are known commercially under various designations as VITON A®, VITON E®, VITON E60C®, VITON E430®, VITON 910®, VITON GH® and VITON GF®. The VITON® designation is a Trademark of E.I. DuPont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, TN505® available from Montedison Specialty Chemical Company. Other polymers useful as heat generating and toner releasing layers in the present invention include silicone rubbers, fluorosilicone, and the like, along with polytetrafluoroethylene (PTFE), fluorinated ethylenepropylene copolymer (FEP), polyfluoroalkoxypolytetrafluoroethylene (PFA Teflon) and the like. These polymers, together with adhesives, can also be included as intermediate layers.

Preferred polymers useful for the heat generating layer and toner releasing layers of the instant on fuser system members include elastomers, especially fluoroelastomers, such as fluoroelastomers of vinylidenefluoride based fluoroelastomers, which contain hexafluoropropylene and tetrafluoroethylene as comonomers. Two preferred known fluoroelastomers are (1) a class of copolymers of vinylidenefluoride and hexafluoropropylene known commercially as VITON A® and (2) a class of terpolymers of vinylidenefluoride, hexafluoropropylene and tetrafluoroethylene known commercially as VITON B®. VITON A®, and VITON B®, and other VITON® designations are trademarks of E.I. DuPont de Nemours and Company. Other commercially available materials include FLUOREL TM of 3M Company, VITON GH®, VITON E60C®, VITON B 910®, and VITON E 430®.

In another preferred embodiment, the fluoroelastomer is one having a relatively low quantity of vinylidenefluoride, such as in VITON GF®, available from E.I. DuPont de Nemours, Inc. The VITON GF® has 35 mole percent of vinylidenefluoride, 34 mole percent of hexafluoropropylene and 29 mole percent of tetrafluoroethylene with 2 percent cure site monomer.

In still another preferred embodiment, the heat generating layer is a fluoroelastomer such as a VITON fluoropolymer, and the toner releasing layer is a silicone layer or a fluoroelastomer such as PFA or PTFE. In a particularly preferred embodiment of the present invention, the heat generating layer is a fluorinated carbon filled VITON fluoroelastomer or volume grafted fluoroelastomer having silver as an additive, and the toner releasing layer is a silicone layer or a fluoropolymer layer such as PFA or PTFE, or a volume grafted fluoroelastomer and such toner releasing layer includes a thermally conductive filler such as carbon black, iron oxide, aluminum oxide, magnesium oxide, graphite, silicone carbide, aluminum nitride, and the like.

Examples of elastomers suitable for use herein for the heat generating layer and the toner releasing layers also include elastomers of the above type, along with volume grafted elastomers. Volume grafted elastomers are a special form of hydrofluoroelastomer and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator. Examples of specific volume graft elastomers are disclosed in U.S. Pat. No. 5,166,031; U.S. Pat. No. 5,281,506; U.S. Pat. No. 5,366,772; and U.S. Pat. No. 5,370,931, the disclosures of which are herein incorporated by reference in their entirety.

Volume graft, in embodiments, refers to a substantially uniform integral interpenetrating network of a hybrid composition, wherein both the structure and the composition of the fluoroelastomer and polyorganosiloxane are substantially uniform when taken through different slices of the fuser member. A volume grafted elastomer is a hybrid composition of fluoroelastomer and polyorganosiloxane formed by dehydrofluorination of fluoroelastomer by nucleophilic dehydrofluorinating agent followed by addition polymerization by the addition of alkene or alkyne functionally terminated polyorganosiloxane.

Interpenetrating network, in embodiments, refers to the addition polymerization matrix where the fluoroelastomer and polyorganosiloxane polymer strands are intertwined in one another.

Hybrid composition, in embodiments, refers to a volume grafted composition which is comprised of fluoroelastomer and polyorganosiloxane blocks randomly arrange.

Generally, the volume grafting according to the present invention is performed in two steps, the first involves the dehydrofluorination of the fluoroelastomer preferably using an amine. During this step, hydrofluoric acid is eliminated which generates unsaturation, carbon to carbon double bonds, on the fluoroelastomer. The second step is the free radical peroxide induced addition polymerization of the alkene or alkyne terminated polyorganosiloxane with the carbon to carbon double bonds of the fluoroelastomer. In embodiments, copper oxide can be added to a solution containing the graft copolymer. The dispersion is then provided onto the fuser member or conductive film surface.

In embodiments, the polyorganosiloxane having functionality according to the present invention has the formula:

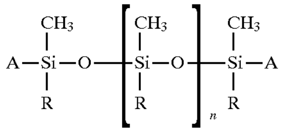

where R is an alkyl from about 1 to about 24 carbons, or an alkenyl of from about 2 to about 24 carbons, or a substituted or unsubstituted aryl of from about 4 to about 18 carbons; A is an aryl of from about 6 to about 24 carbons, a substituted or unsubstituted alkene of from about 2 to about 8 carbons, or a substituted or unsubstituted alkyne of from about 2 to about 8 carbons; and n is from about 2 to about 400, and preferably from about 10 to about 200 in embodiments.

In preferred embodiments, R is an alkyl, alkenyl or aryl, wherein the alkyl has from about 1 to about 24 carbons, preferably from about 1 to about 12 carbons; the alkenyl has from about 2 to about 24 carbons, preferably from about 2 to about 12 carbons; and the aryl has from about 6 to about 24 carbon atoms, preferably from about 6 to about 18 carbons. R may be a substituted aryl group, wherein the aryl may be substituted with an amino, hydroxy, mercapto or substituted with an alkyl having for example from about 1 to about 24 carbons and preferably from 1 to about 12 carbons, or substituted with an alkenyl having for example from about 2 to about 24 carbons and preferably from about 2 to about 12 carbons. In a preferred embodiment, R is independently selected from methyl, ethyl, and phenyl. The functional group A can be an alkene or alkyne group having from about 2 to about 8 carbon atoms, preferably from about 2 to about 4 carbons, optionally substituted with an alkyl having for example from about 1 to about 12 carbons, and preferably from about 1 to about 12 carbons, or an aryl group having for example from about 6 to about 24 carbons, and preferably from about 6 to about 18 carbons. Functional group A can also be mono-, di-, or trialkoxysilane having from about 1 to about 10 and preferably from about 1 to about 6 carbons in each alkoxy group, hydroxy, or halogen. Preferred alkoxy groups include methoxy, ethoxy, and the like. Preferred halogens include chlorine, bromine and fluorine. A may also be an alkyne of from about 2 to about 8 carbons, optionally substituted with an alkyl of from about 1 to about 24 carbons or aryl of from about 6 to about 24 carbons. The group n is from about 2 to about 400, and in embodiments from about 2 to about 350, and preferably from about 5 to about 100. Furthermore, in a preferred embodiment n is from about 60 to about 80 to provide a sufficient number of reactive groups to graft onto the fluoroelastomer. In the above formula, typical R groups include methyl, ethyl, propyl, octyl, vinyl, allylic crotnyl, phenyl, naphthyl and phenanthryl, and typical substituted aryl groups are substituted in the ortho, meta and para positions with lower alkyl groups having from about 1 to about 15 carbon atoms. Typical alkene and alkenyl functional groups include vinyl, acrylic, crotonic and acetenyl which may typically be substituted with methyl, propyl, butyl, benzyl, tolyl groups, and the like.

The amount of fluoroelastomer or silicone elastomer used to provide the heat generating layer or the toner releasing layer of the present invention is dependent on the amount necessary to form the desired thickness of the layer or layers of surface material. Specifically, the fluoroelastomer or silicone elastomer is added in an amount of from about 60 to about 99 percent, preferably about 70 to about 99 percent by weight.

Any known solvent suitable for dissolving a fluoroelastomer may be used in the present invention. Examples of suitable solvents for the present invention include methyl ethyl ketone, methyl isobutyl ketone, diethyl ketone, cyclohexanone, n-butyl acetate, amyl acetate, and the like. Specifically, the solvent is added in an amount of from about 25 to about 99 percent, preferably from about 70 to about 95 percent.

The dehydrofluorinating agent which attacks the fluoroelastomer generating unsaturation is selected from basic metal oxides such as MgO, CaO, $Ca(OH)_2$ and the like, and strong nucleophilic agents such as primary, secondary and tertiary, aliphatic and aromatic amines, where the aliphatic and aromatic amines have from about 2 to about 15 carbon atoms. Also included are aliphatic and aromatic diamines and triamines having from about 2 to about 15 carbon atoms where the aromatic groups may be benzene, toluene, naphthalene, anthracene, and the like. It is generally preferred for the aromatic diamines and triamines that the aromatic group be substituted in the ortho, meta and para positions. Typical substituents include lower alkyl amino groups such as ethylamino, propylamino and butylamino, with propylamino being preferred. The particularly preferred curing agents are the nucleophilic curing agents such as VITON CURATIVE VC-50® which incorporates an accelerator (such as a quaternary phosphonium salt or salts like VC-20) and a crosslinking agent (bisphenol AF or VC-30); DIAK 1 (hexamethylenediamine carbamate) and DIAK 3 (N,N'-dicinnamylidene-1,6 hexanediamine). The dehydrofluorinating agent is added in an amount of from about 1 to about 20 weight percent, and preferably from about 2 to about 10 weight percent.

The substrate for the instant on fuser member, and for other members of the fusing system including fuser rolls, belts, films and the like; pressure rolls, belts, films, and the like; and donor rolls, belts, films, and the like, according to the present invention may be of any suitable material. Typically, it is a roll and takes the form of a hollow cylindrical tube of certain plastics chosen to maintain rigidity, structural integrity and high heat durability. In a preferred embodiment of the invention, the substrate is a hollow cylindrical plastic core. The plastic must be suitable for allowing a high operating temperature (i.e., greater than about 180, preferably greater than 200° C.), capable of exhibiting high mechanical strength, providing heat insulating properties (this, in turn, improves the thermal efficiency of the proposed fusing system), and possessing electrical insulating properties. In addition, it is preferred that the plastic have a flexural strength of from about 2,000,000 to about 3,000,000 psi, and a flexural modulus of from about 25,000 to about 55,000 psi. Plastics possessing the above characteristics and which are suitable for use as the substrate for the instant on fuser members include; Ultem® available from General Electric, Ultrapeke® available from BASF, PPS (polyphenylene sulfide) sold under the tradenames Fortron® available from Hoechst Celanese, Ryton R-4® available from Phillips Petroleum, and Supec® available from General Electric; PAI (polyamide imide) sold under the tradename Torlon® 7130 available from Amoco; polyketone (PK) sold under the tradename Kadel® E1230 available from Amoco; PI (polyimide); PEEK (polyether ether ketone) sold under the tradename PEEK 450GL30 from Victrex; polyphthalamide sold under the tradename Amodel® available from Amoco; PES (polyethersulfone); PEI (polyetherimide); PAEK (polyaryletherketone); PBA (polyparabanic acid); silicone resin; or fluorinated resin such as PTFE (polytetrafluoroethylene); PFA (perfluoroalkoxy); FEP (fluorinated ethylene propylene); liquid crystalline resin (Xydar®) available from Amoco, and the like, or mixtures thereof. These plastics can be filled with glass or other minerals in order to enhance their mechanical strength without changing the thermal properties. In preferred embodiments, the plastic core is comprised of a high temperature plastic with superior mechanical strength such as polyphenylene sulfide, polyamide imide, polyimide, polyketone, polyphthalamide, polyether ether ketone, polyethersulfone, polyetherimide, and polyparabanic acid.

The use of a plastic core as set forth above in fuser members herein allows for a light weight, low cost fuser system member to be produced. Moreover, the high temperature plastic helps allow for quick warm-up and is therefore, more energy efficient than other known fuser member. In addition, because the core of the fuser member is comprised of plastic, there is a real possibility that such fuser members can be recycled. Moreover, these cores allow for high thermal efficiency by providing superior insulation.

Optional intermediate adhesive layers and/or elastomer layers may be applied to achieve desired properties and performance objectives of the present conductive film. An adhesive intermediate layer may be selected from, for example, epoxy resins and polysiloxanes. Preferred adhesives are proprietary materials such as THIXON 403/404, Union Carbide A-1100, Dow TACTIX 740, Dow TACTIX 741, and Dow TACTIX 742. A particularly preferred curative for the aforementioned adhesives is Dow H41.

There may be provided an adhesive layer between the substrate and the heat generating layer. There may also be an adhesive layer between the heat generating layer and the toner releasing layer.

The heat generating layer of the instant on fuser member is deposited on the plastic substrate via a well known web coating process or draw coating process. Other known methods for forming the outer layer on the substrate film such as spinning, dipping, spraying such as by multiple spray applications of very thin films, casting, plasma deposition, or the like can also be used. The toner releasing layer is deposited on the heat generating layer in the a similar manner as the heat generating layer is deposited on the substrate.

The thickness of the heat generating layer can vary depending upon specific applications from about 10 to about 500 $\mu$m, preferably from about 20 to about 250 $\mu$m. The thickness of the toner releasing layer is from about 10 to about 500 $\mu$m, preferably from about 20 to about 250 $\mu$m thick.

The plastic substrate has a diameter of from about 0.2 to about 3 inches. The thickness of the plastic will depend on the mechanical property of the plastic but is preferably from about ⅛ to about ½ inch thick. The substrate in the form of a cylindrical roll may be from about 3 to about 20 inches, preferably from about 9 to about 14 inches long.

The fuser system members of the present invention allow for relatively fast warm up time. The fast warm-up time for the fusing system members of the present invention is up to from about less than 1 minute, preferably up to less than about 30 seconds. This is the amount of time it takes for the fuser member to heat up from room temperature (24° C.) to a temperature of approximately 200° C. This allows the fuser to be in an off mode when the particular machine is not being used which, in turn, allows for a significant reduction in energy consumption.

The fuser members herein having a heat generating layer comprising fluorinated carbon filled fluoroelastomers and optional additive(s) exhibit superior electrical and mechanical properties. Further, the fuser members herein have decreased sensitivities to changes in relative humidity and to high temperature. Moreover, the fuser members herein have sufficient release properties and exhibit a decrease in contamination of other xerographic components such as photoconductors. In addition, by use of the fuser members of the present invention, in embodiments, a reduction in warm up time and a reduction in energy use may be obtained.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example I

A resistive heating layer containing a mixture of Accufluor 2010 and silver powder dispersed in Viton GF was prepared in the following manner. First, a solvent (200 g of methyl ethyl ketone), steel shots (2300 g), silver powder (30 g, particle size 2–4 $\mu$m), Viton GF (22.5 g) and Accufluor 2010 (13.1 g) were mixed at a relatively low speed in a small bench top attritor (model 01 A). The mixture was attrited for 30 minutes. A curative package [(1.15) g of DuPont VC50, 0.45 g Maglite-D and 0.1 g ($Ca(OH)_2$) and a stabilizing solvent (10 g methanol)] were then introduced and the mixture was mixed at high speed for another 15 minutes. After filtering the steel shot through a wire screen, the dispersion was collected in an 8 ounce polypropylene bottle. The dispersion was then diluted with about 400 g of methyl isobutylketone and the resulting mixture was air-sprayed onto Kapton polyimide film substrates to yield a dry thickness of approximately 4.8 mil.

The sprayed layer was first air-dried for approximately 2 hours and then heat cured in a programmable oven. The heating sequence was as follows: (1) 65° C. for 4 hours; (2) 93° C. for 2 hours; (3) 144° C. for 2 hours; (4) 177° C. for 2 hours, (5) 204° C. for 2 hours., and (6) 232° C. for 16 hours.

A heating layer of 4.8 mil in thickness was cut to a dimension of 4.5"×9" and the resistance of the layer was found to be approximately 70 Ω across the entire length. When an electrical current of approximately 240 watts was applied to the layer, the layer heated from room temperature (approximately 74° F.) to 350° F. in approximately 22 seconds.

Example II

A coating dispersion similar to that of Example I was prepared with the exception that 38 g of silver powder was used instead. A 4.5"×9" heating layer was coated, dried and cured according to the procedures described in Example I. The dried thickness was found to be approximately 6.5 mil and the resistance of the layer was found to be about 60 Ω. The layer took approximately 8 seconds to heat up from approximately 74° F. to 350° F. at an applied power of approximately 350 watts.

EXAMPLE III

A coating dispersion was prepared by combining half of the dispersion prepared in Example II with 20 g of an Electrodage® 504 dispersion from Acheson, Port Huron, Mich. which comprises a silver/fluoroelastomer dispersion in MEK (56% silver, 38% MEK and 6% fluoroelastomer). The combination was mixed well on a roll mill. A heating layer was then prepared according to the procedure in Example I. The dry thickness of the layer was approximately 5.4 mil and the resistance of a 4.5"×9" layer was approximately 29 Ω. This layer was heated up from approximately 74° F. to 350° F. in about 4.3 seconds at an applied voltage of 700 watts.

EXAMPLE IV

A coating dispersion was prepared by first adding a solvent (200 g of methyl ethyl ketone), steel shots (2300 g), Viton GF (22.5 g) and Accufluor 2010 (13.1 g) in a small bench top attritor. The mixture was attrited at a slow speed for 30 minutes. The curative package [(1.15 g VC50, 0.4 g Maglite-D and 0.1 g $Ca(OH)_2$], and a stabilizing solvent (10 g methanol) were then introduced and the mixture was mixed in the attritor at a relatively high speed for another 15 minutes. After filtering the steel shot through a wire where, the dispersion was collected in an 8 ounce polypropylene bottle. Methyl isobutylketone was added until the total weight of the dispersion was approximately 300 g. The prepared Accufluor 2010/Viton GF dispersion was then combined with 100 g of an Electrodage® 504 dispersion from Acheson (see Example III). The mixture was roll-milled for approximately 1 hour. A low mass, resistive fuser prototype was prepared by spraying this dispersion onto a 1" O.D., 9" long (thickness 5⁄32") Pyrex glass tube. The drying and curing were performed according to Example I. The resistive layer had a resistance of about 10 Ω and was about 4 to 5 mil thick. This prototype was heated up from 74° to 350° F. in about 16 seconds when a power of approximately 950 watts was applied.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A fuser member comprising:

a) a plastic substrate;

b) a heat generating layer provided on said substrate, said heat generating layer comprising a fluorinated carbon filled fluoroelastomer; and c) a toner release layer provided on said heat generating layer.

2. A fuser member in accordance with claim 1, wherein the fluorinated carbon is present in an amount of from about 1 to about 50 percent by weight based on the weight of total solids.

3. A fuser member in accordance with claim 2, wherein the fluorinated carbon is present in an amount of from about 5 to about 30 percent by weight based on the weight of total solids.

4. A fuser member in accordance with claim 1, wherein the fluorinated carbon has a fluorine content of from about 5 to about 65 weight percent based on the weight of fluorinated carbon, and a carbon content of from about 95 to about 35 weight percent.

5. A fuser member in accordance with claim 4, wherein the fluorinated carbon has a fluorine content of from about 10 to about 30 weight percent based on the weight fluorinated carbon, and a carbon content of from about 90 to about 70 weight percent.

6. A fuser member in accordance with claim 1, wherein the fluorinated carbon is of the formula $CF_x$, wherein x represents the number of fluorine atoms.

7. A fuser member in accordance with claim 6, wherein the fluorinated carbon is of the formula $CF_x$, wherein x represents the number of fluorine atoms and is from about 0.02 to about 1.5.

8. A fuser member in accordance with claim 7, wherein the fluorinated carbon is of the formula $CF_x$, wherein x is from about 0.04 to about 1.4.

9. A fuser member in accordance with claim 1, wherein said fluorinated carbon is selected from the group consisting of a fluorinated carbon having a fluorine content of 62 weight percent, having a fluorine content of 11 weight percent, having a fluorine content of 28 weight percent, and having a weight content of 65 weight percent.

10. A fuser member in accordance with claim 1, wherein the fluoroelastomer of the heat generating layer is selected from the group consisting of a) copolymers of vinylidenefluoride, hexafluoropropylene, and tetrafluoroethylene, and b) terpolymers of vinylidenefluoride hexafluoropropylene and tetrafluoroethylene.

11. A fuser member in accordance with claim 1, wherein the fluoroelastomer of the heat generating layer comprises 35 mole percent of vinylidenefluoride, 34 mole percent of hexafluoropropylene, 29 mole percent of tetrafluoroethylene and 2 mole percent of a cure site monomer.

12. A fuser member in accordance with claim 1, wherein the fluoroelastomer of the heat generating layer is a volume grafted fluoroelastomer.

13. A fuser member in accordance with claim 1, wherein the fluoroelastomer of the heat generating layer is present in an amount of from about 20 to about 60 percent by weight.

14. A fuser member in accordance with claim 1, wherein the resistance of the heat generating layer is from about 2 to about 500 ohms.

15. A fuser member in accordance with claim 14, wherein the resistance of the heat generating layer is from about 5 to about 100 ohms.

16. A fuser member in accordance with claim 1, wherein said heat generating layer further comprises a conductive filler selected from the group consisting of carbon black, graphite, silver, and nickel.

17. A fuser member in accordance with claim 16, wherein said heat generating layer filler is silver.

18. A fuser member in accordance with claim 17, wherein the silver is present in the heat generating layer in an amount of from about 20 to about 70 weight percent based on the weight of total solids.

19. A fuser member in accordance with claim 1, wherein said heat generating layer has a thickness of from about 20 to about 250 $\mu$m.

20. A fuser member in accordance with claim 1, wherein said toner release layer comprises a polymer selected from the group consisting of silicone rubbers, fluorosilicone, polytetrafluoroethylene, fluorinated ethylenepropylene copolymer, polyfluoroalkoxypolytetrafluoroethylene, a) copolymers of vinylidenefluoride, hexafluoropropylene and tetrafluoroethylene, and b) terpolymers of vinylidenefluoride hexafluoropropylene and tetrafluoroethylene.

21. A fuser member in accordance with claim 20, wherein the toner release layer comprises an elastomer selected from the group consisting of polytetrafluoroethylene, fluorinated ethylenepropylene copolymer, and polyfluoroalkoxypolytetrafluoroethylene.

22. A fuser member in accordance with claim 1, wherein the toner release layer comprises a volume grafted elastomer.

23. A fuser member in accordance with claim 1, wherein said toner release layer comprises a thermally conductive filler selected from the group consisting of silicone carbide, aluminum nitride, carbon black and graphite.

24. A fuser member in accordance with claim 23, wherein said filler is present in said toner release layer in an amount of from about 5 to about 30 percent by weight of total solids.

25. A fuser member in accordance with claim 1, wherein said toner release layer has a thickness of from about 20 to 250 $\mu$m.

26. A fuser member in accordance with claim 1, wherein said substrate is a hollow cylindrical roll.

27. A fuser member in accordance with claim 26, wherein said cylindrical substrate roll comprises a plastic selected from the group consisting of polyphenylene sulfide, polyamide imide, polyimide, polyketone, polyphthalamide, polyether ether ketone, polyethersulfone, polyetherimide, polyaryletherketone, and polyparabanic acid.

28. A fuser member in accordance with claim 27, wherein said plastic substrate has a thickness of from about ⅛ to about ½ inch.

29. A fuser member in accordance with claim 26, wherein said substrate roll has a diameter of from about 0.2 to about 3 inches.

30. A fuser member in accordance with claim 1, wherein said fuser member has the ability to warm up from a temperature of about 24° C. to a temperature of up to about 200° C. in a time of less than about 1 minute.

31. A fuser member in accordance with claim 30, wherein said warm-up time is about less than 30 seconds.

32. A fuser member having the ability to warm up from a temperature of about 24° C. to a temperature of up to about 200° C. in a time of less than about 1 minute comprising:

a) a plastic cylindrical roll substrate;

b) a heat generating layer provided on said roll substrate, said heat generating layer comprising a fluorinated carbon and silver filled fluoroelastomer; and c) a toner release layer provided on said heat generating layer.

33. A fuser member having the ability to warm up to a temperature of up to about 200° C. in a time of less than about 30 seconds comprising:

a) a plastic cylindrical roll substrate;

b) a heat generating layer provided on said roll substrate, said heat generating layer comprising a fluorinated carbon and silver filled fluoroelastomer, wherein said heat generating layer has a resistivity of from about 5 to 100 ohms; and c) a toner release layer provided on said heat generating layer.

* * * * *